US006722010B2

United States Patent
Maruyama et al.

(10) Patent No.: US 6,722,010 B2
(45) Date of Patent: Apr. 20, 2004

(54) PRODUCT DISASSEMBLING AND ASSEMBLING SYSTEM AND A METHOD OF DISASSEMBLING AND ASSEMBLING THE PRODUCT

(75) Inventors: Tohru Maruyama, Fujisawa (JP); Kenichi Shinozaki, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 399 days.

(21) Appl. No.: 09/819,892

(22) Filed: Mar. 29, 2001

(65) Prior Publication Data

US 2001/0047578 A1 Dec. 6, 2001

(30) Foreign Application Priority Data

Mar. 29, 2000 (JP) ........................................ 2000-092387

(51) Int. Cl.[7] ........................... B23P 19/00; B23P 21/00
(52) U.S. Cl. ........................ 29/426.3; 29/426.1; 29/705
(58) Field of Search ........................ 29/700, 701, 705, 29/426.1, 426.3, 403.1, 403.2, 403.3, 428, 429, 430

(56) References Cited

FOREIGN PATENT DOCUMENTS

EP        0 596 509       5/1994

OTHER PUBLICATIONS

Definition of an operating system; Microsoft Computer Dictionary; 4th Edition, © 1999; p. 321.*
Patent Abstracts of Japan, vol. 1999, No. 14, Dec. 22, 1999, JP 11–239926, Sep. 7, 1999.
Patent Abstracts of Japan, vol. 1998, No. 03, Feb. 27, 1998, JP 9–300144, Nov. 25, 1997.
Patent Abstracts of Japan, vol. 2000, No. 01, Jan. 31, 2000, JP–11–291135, Oct. 26, 1999.
Patent Abstracts of Japan, vol. 2000, No. 02, Feb. 29, 2000, JP 11–320296, Nov. 24, 1999.

* cited by examiner

*Primary Examiner*—John C. Hong
(74) *Attorney, Agent, or Firm*—Oblon, Spivak, McClelland, Maier & Neustadt, P.C.

(57) ABSTRACT

A system and method for disassembling and assembling a product. The system includes a production facility for assembling a product, a processing facility for disassembling a used product and offering the unit or parts of the used product for assembling the product after the unit and parts are processed, and a commonly-used processing facility for practicing mutually reversible steps between the process of assembling the product and the process of disassembling the used product and offering the unit and parts for assembling the product and/or for practicing steps which are identical for the assembling and disassembling processes. The method includes the steps of performing an assembling process, performing a disassembling process, and performing in a commonly-used processing facility mutually reversible steps between the assembling and disassembling process and/or performing steps which are identical for the assembling and disassembling processes.

24 Claims, 9 Drawing Sheets

PRODUCT DISASSEMBLING AND ASSEMBLING SYSTEM AND A METHOD OF DISASSEMBLING AND ASSEMBLING THE PRODUCT

CROSS-REFERENCE TO RELATED APPLICATIONS

This application claims priority under 35 U.S.C. §119 to Japanese Patent Application No. 2000-092387 filed on Mar. 29, 2000, the entire contents of which are incorporated herein by reference.

BACKGROUND OF THE INVENTION

1. Field of the Invention

The present invention relates to a system and method for disassembling and assembling a product.

2. Discussion of the Background

In recent years, environmental maintenance, i.e., recycling, has become an important part of manufacturing. For such products as copy machines, printers, etc., various recycle and reuse methods have been developed in order to save and effectively utilize resources.

A remanufactured machine is one example of the recycle and reuse of a used product. The remanufactured machine, also called a "second-hand" machine, is made by partially disassembling and cleaning the used product and minimally replacing used parts with new parts, then re-assembling the product. However, compared with a brand-new product, quality of the remanufactured machine is not guaranteed. As such, evaluation in the market is low and the cost benefit for remanufactured machines is small.

Therefore, in order for the remanufactured machine to be effectively utilized and placed on the market, thereby prompting increased production, the quality of the remanufactured machine needs to be guaranteed to the same extent that the quality of the brand-new product is. Then, the quality of the remanufactured machine would be guaranteed, evaluation in the market for the remanufactured machine would increase, and recycle and reuse would increase, thereby contributing to increased energy saving for manufacturing.

A system for producing the remanufactured machine is disclosed in the published specification of Japanese Laid-Open Patent Publication No. 11-239926, in which the system is described as providing a high-quality and reasonable device in a product recycle system for a product disassembling and assembling process. The system includes a disassembling line for disassembling the main body of the used product and taking out the used parts, an assembling line for assembling a new product, a first conveying device for supplying the used parts from the disassembling line to the assembling line, a storage section for storing new parts, a second conveying device for supplying the new parts from the storage section to the assembling line, and a control device for performing a control operation so as is supply the number of new parts from the storage section to the assembling line in accordance with the number of new products to be assembled and the number of used parts from the disassembling line to be used in the new products.

However, in this system, it is necessary to prepare the disassembling line for disassembling the used product and taking out the used parts and the assembling line for assembling the new product for simultaneous use. As such, the inputting robot, the conveying device, the disassembling robot, the checking device, and the accommodating device of this system are needed in both the disassembling line and the assembling line at the same time.

The published specification of Japanese Laid-Open Patent Publication No. 11-291135 discloses a system for automatically assembling and disassembling a product in which an automatic machine performs the disassembling and assembling, reusing the disassembled parts effectively. The system is described as flexibly coping with both the assembling and the disassembling without changing the direction of the manufacturing line. The system judges whether the process to be completed is assembling or disassembling based on the parts conveyed to the automatic machine. Based on the judgement, the system performs the automatic assembling of the parts and the automatic checking of the product or performs the automatic disassembling of the product and automatic checking of the disassembled parts. This automatic process is selectively practiced in order to determine the parts which can be used again.

However, in this system, in general, if the sequence for the assembling the product is parts a→parts b→parts c, then the sequence for the disassembling the product is the reverse, part c→parts b→parts a. Therefore, assembling and disassembling the parts have to be performed in the same working section, and the toolings for assembling/disassembling may become inevitably complicated. Furthermore, since the judgement of what the process to be performed is made after conveying the parts to the automatic machine, the parts supplying device for assembling the parts and the parts withdrawing device after disassembling the product must always be prepared. As such, the line structures may become very complicated, resulting in a lower operation ratio.

In the future, withdrawing a used product from the market and reusing the used product may become the responsibility of the product manufacturer. If 100% of the used products are withdrawn, disassembled, and reused, the number of used products may become very large. As such, it is estimated that a very large specialized factory for disassembling the used products may be required. Therefore, there would be a large economic burden to the manufacturer for building the large specialized factory. In addition, the number of used products withdrawn from the market depends largely on the present economy and trends in the market. As such, the work load of the specialized factory varies, which could lead to uneffectiveness and a cost increase of the remanufactured machine. Consequently, increased recycle and reuse may not occur and the energy saving to the manufacturer may shrink or disappear.

SUMMARY OF THE INVENTION

Accordingly, one object of the present invention is to provide an improved product disassembling and assembling system and method.

Another object of the present invention is to provide a compact product disassembling and assembling system and method.

Still another object of the present invention is to provide a product disassembling and assembling system and method which reduces product manufacturing cost.

These and other objects are accomplished by a novel system and method for disassembling and assembling a product.

A first aspect of the present invention relates to a product disassembling and assembling system including a producing facility for performing a first process of producing the product and a processing facility for performing a second process of disassembling a used product and offering the unit or parts of the used product for producing the product after the unit or parts have been processed. The product disassembling and assembling system further includes a commonly-used process facility for practicing both the mutually reversible steps between the first and second processes and/or the same process for the first and second processes step.

In a second aspect of the present invention relating to the product disassembling and assembling system in connection with the first aspect, at least one commonly-used process facility is controlled by a computer. The product disassembling and assembling system further includes a changing-over device for changing over the program employed in the computer and the data employed in the program for the first and second processes.

In a third aspect of the present invention relating to the product disassembling and assembling system in connection with the second aspect, a plurality of commonly-used process facilities are controlled by the computer. The changing-over device performs in a gross a changing-over operation of the plurality of commonly-used process facilities.

In a fourth aspect of the present invention relating to the product disassembling and assembling system in connection with one of the first through third aspects, the commonly-used process facility is a main body assembling and disassembling system used for assembling the unit or parts constructing the product main body and for disassembling the used product into the unit or parts.

In a fifth aspect of the present invention relating to the product disassembling and assembling system in connection with one of the first through fourth aspects, the commonly-used process facility is a unit assembling and disassembling facility used for assembling the parts constructing the product main body and thereby producing the product main body and the unit constructing the product main body, and for disassembling the unit constructing the used product or the used product main body into the parts.

In a sixth aspect of the present invention relating to the product disassembling and assembling system in connection with one of the first through fifth aspects, the commonly-used process facility is a unit storage warehouse used for temporarily preserving a newly-made unit constructing the product main body employed for producing the product and temporarily preserving the unit of the used product after disassembling.

In a seventh aspect of the present invention relating to the product disassembling and assembling system in connection with one of the first through sixth aspects, the commonly-used process facility is a parts storage warehouse used for temporarily preserving newly-made parts constructing the product main body or the unit constructing the product main body employed for producing the product and for temporarily preserving the parts of the used product after disassembling.

In an eighth aspect of the present invention relating to the product disassembling and assembling system in connection with the fourth aspect, a second commonly-used process facility is a unit storage warehouse used for temporarily preserving a newly-made unit constructing the product main body employed for producing the product and for temporarily preserving the unit of the used product after disassembling. A third commonly-used process facility is a conveying device used for conveying the newly-made unit and/or the unit of the used product from the main body assembling and disassembling facility to the unit storage warehouse and conveying the newly-made unit and/or the unit of the used product from the unit storage warehouse to the main body assembling and disassembling facility.

In a ninth aspect of the present invention relating to the product disassembling and assembling system in connection with the fifth aspect, a second commonly-used process facility is a parts storage warehouse used for temporarily preserving newly-made parts constructing the product main body or the unit constructing the product main body employed for producing the product and for temporarily preserving the parts of the used product after disassembling. A third commonly-used process facility is a conveying device used for conveying the newly-made parts and/or the parts of the used product from the unit assembling and disassembling facility to the parts storage warehouse and for conveying the newly-made parts and/or the parts of the used product from the parts storage warehouse to the unit assembling and disassembling facility.

In a tenth aspect of the present invention relating to the product disassembling and assembling system in connection with one of the first through ninth aspects, the commonly-used process facility is a main body checking facility used for checking the product main body after producing the product and for checking the used product main body.

In an eleventh aspect of the present invention relating to the product disassembling and assembling system in connection with one of the first through tenth aspects, the commonly-used process facility is a unit checking facility used for checking the newly-made unit constructing the product main body employed for producing the product and for checking the unit of the used product after disassembling.

In a twelfth aspect of the present invention relating to the product disassembling and assembling system in connection with one of the first through eleventh aspects, the commonly-used process facility is a parts checking facility used for checking the parts constructing the product main body or the unit constructing the product main body employed for producing the product and for checking the parts of the used product after disassembling.

Thirteenth through twenty-fourth aspects of the present invention respectively relate to the method of disassembling and assembling the product corresponding to the first through twelfth aspects.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1A:
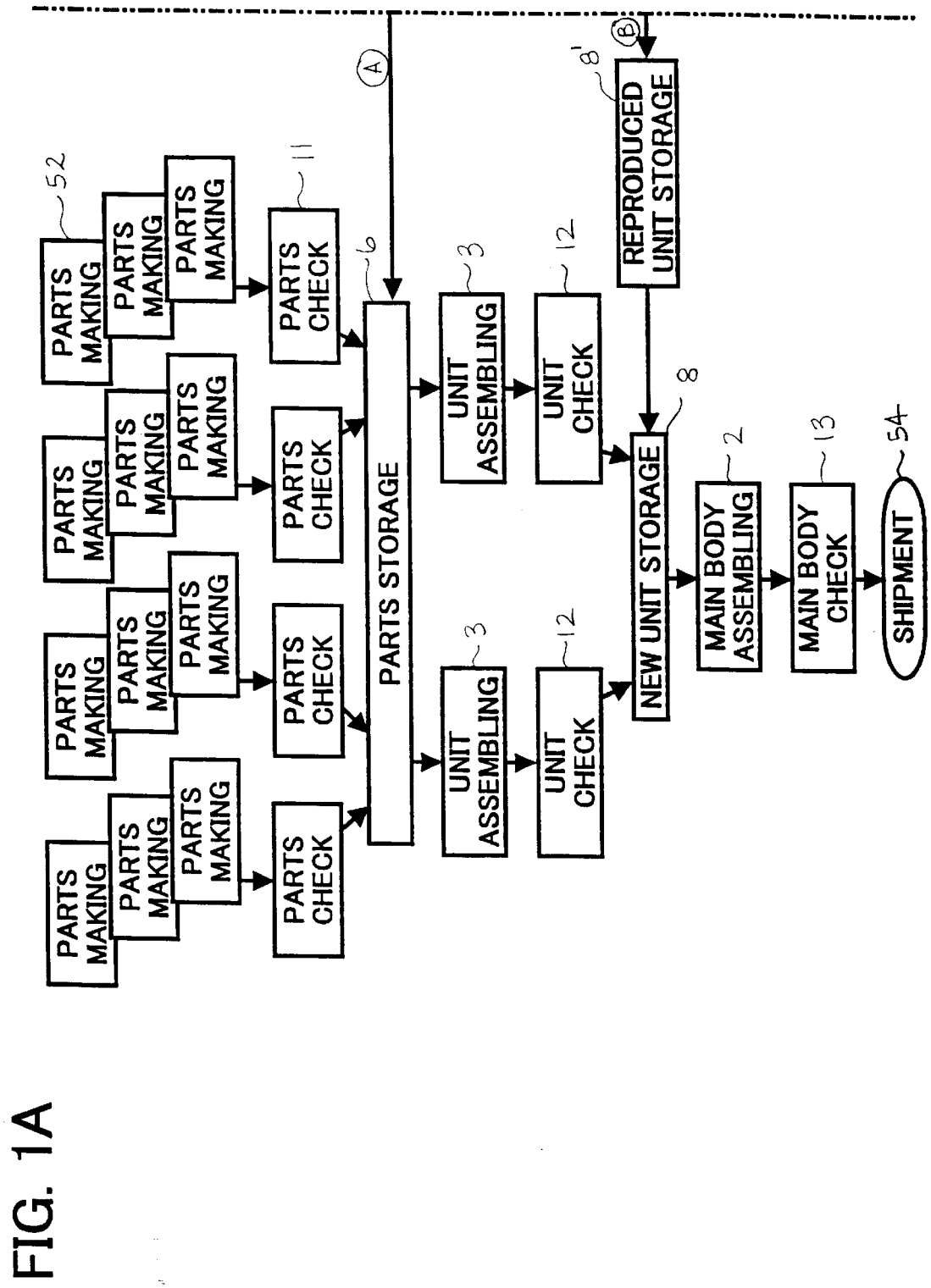
FIGS. 1A and 1B are process flow diagrams illustrating the method for disassembling and assembling a product of the present invention.

Referring now to the drawings, in which like reference numerals designate identical or corresponding parts throughout the several views, and more particularly to FIGS. 1 through 8, a product disassembling and assembling system and a method of the disassembling and assembling the product are described in detail, hereafter.

Figure 1B:
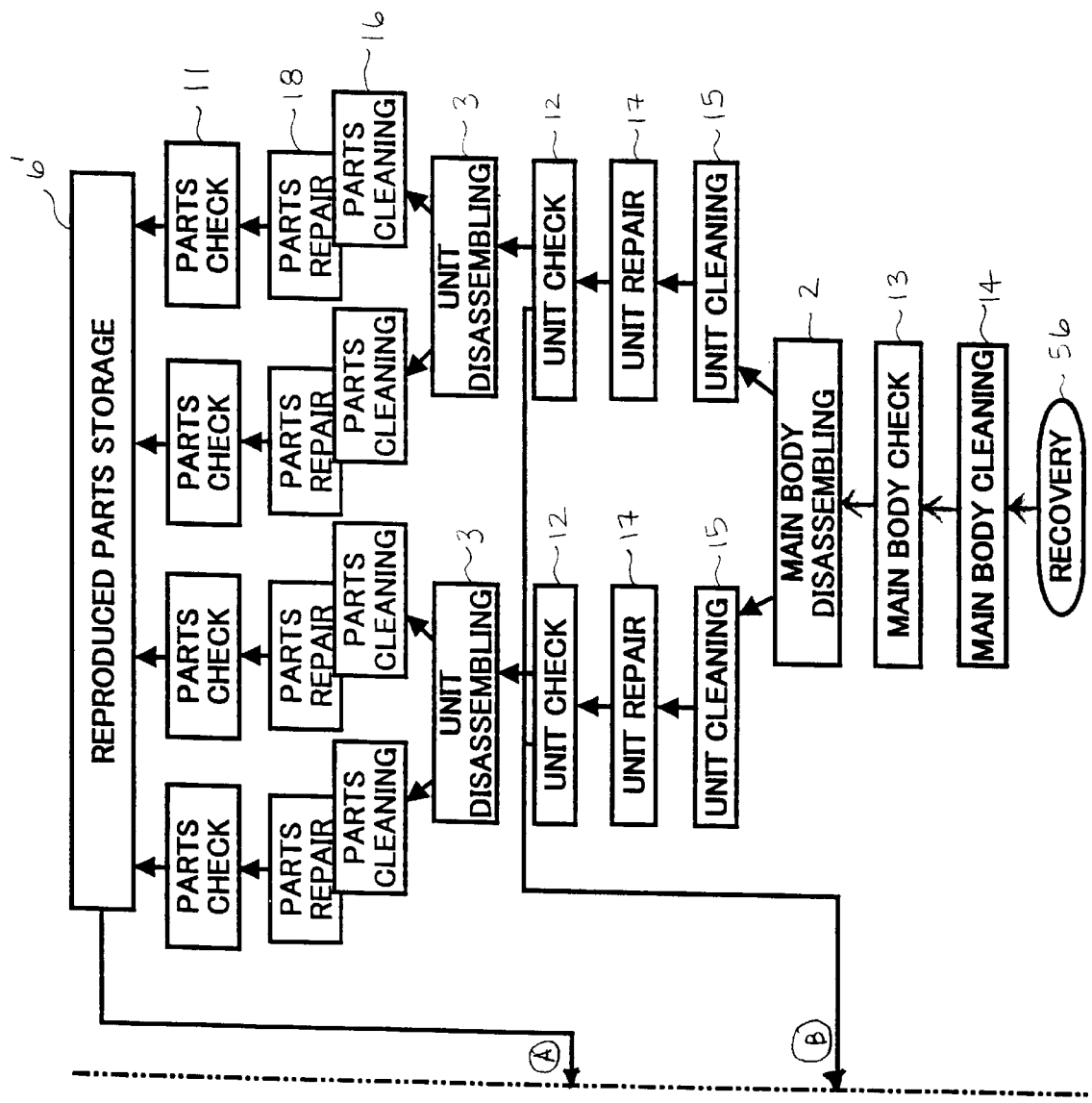

FIGS. 1A and 1B are process flow diagrams illustrating an embodiment of the method for disassembling and assembling a product of the present invention.

An exemplary product relating to the present embodiment of the invention is an image forming apparatus such as a copying machine and a printer. The assembly of the image forming apparatus includes two assembly portions: a unit assembly in which previously assembled parts such as a lens, mirror, roller, bearing, motor, and PCB (printed circuit board) are assembled into units and a main body assembly in which the units assembled in the unit assembly are assembled into main body frames, i.e. the finished product.

FIG. 1A shows the process flow of the assembly operation of the system of the present invention. New parts of the product are manufactured in the parts making facility 52. The new parts are then checked in the parts check facility 11. The checked parts are then stored in the parts storage warehouse 6. In addition to the new parts, the parts storage warehouse 6 also stores used (reproduced) parts from disassembled used products sent through line A in FIG. 1A.

The new parts and the used parts thus stored are assembled into a new unit in the unit assembling facility 3. The new unit is then checked in the unit check facility 12. The checked unit is then stored in the unit storage warehouse 8. In addition to the new unit, the unit storage warehouse 8 also stores used (reproduced) units from the reproduced unit storage facility 8'.

Both new units made from the new parts or the used parts and used units from disassembled used products are assembled into a new product main body in the main body assembling facility 2. The new product main body is then checked in the main body check facility 13 and shipped out by the shipment facility 54.

FIG. 1B shows the process flow of the disassembly operation of the system of the present invention. A used product is withdrawn from the market place and placed in the recovery facility 56. The used product main body is then cleaned in the main body cleaning facility 14. The cleaned used product main body is checked in the main body check facility 13. The used product main body is then disassembled into used units in the main body disassembling facility 2. The used units after disassembly are cleaned in the unit cleaning facility 15, then repaired in the unit repair facility 17, and checked in the unit check facility 12. Some of the used units after checking are temporarily stored in the reproduced unit storage facility 8' (through line B), where they are then sent to the unit storage warehouse 8, shown in FIG. 1A. Other used units after checking are further disassembled into used parts in the unit disassembling facility 3. The used parts are cleaned in the parts cleaning facility 16, then repaired in the parts repair facility 18, and then checked in the parts check facility 11. The checked used parts are temporarily stored in the reproduced parts storage facility 6', where they are then sent (through line A) to the parts storage warehouse 6 shown in FIG. 1A.

Figure 2:
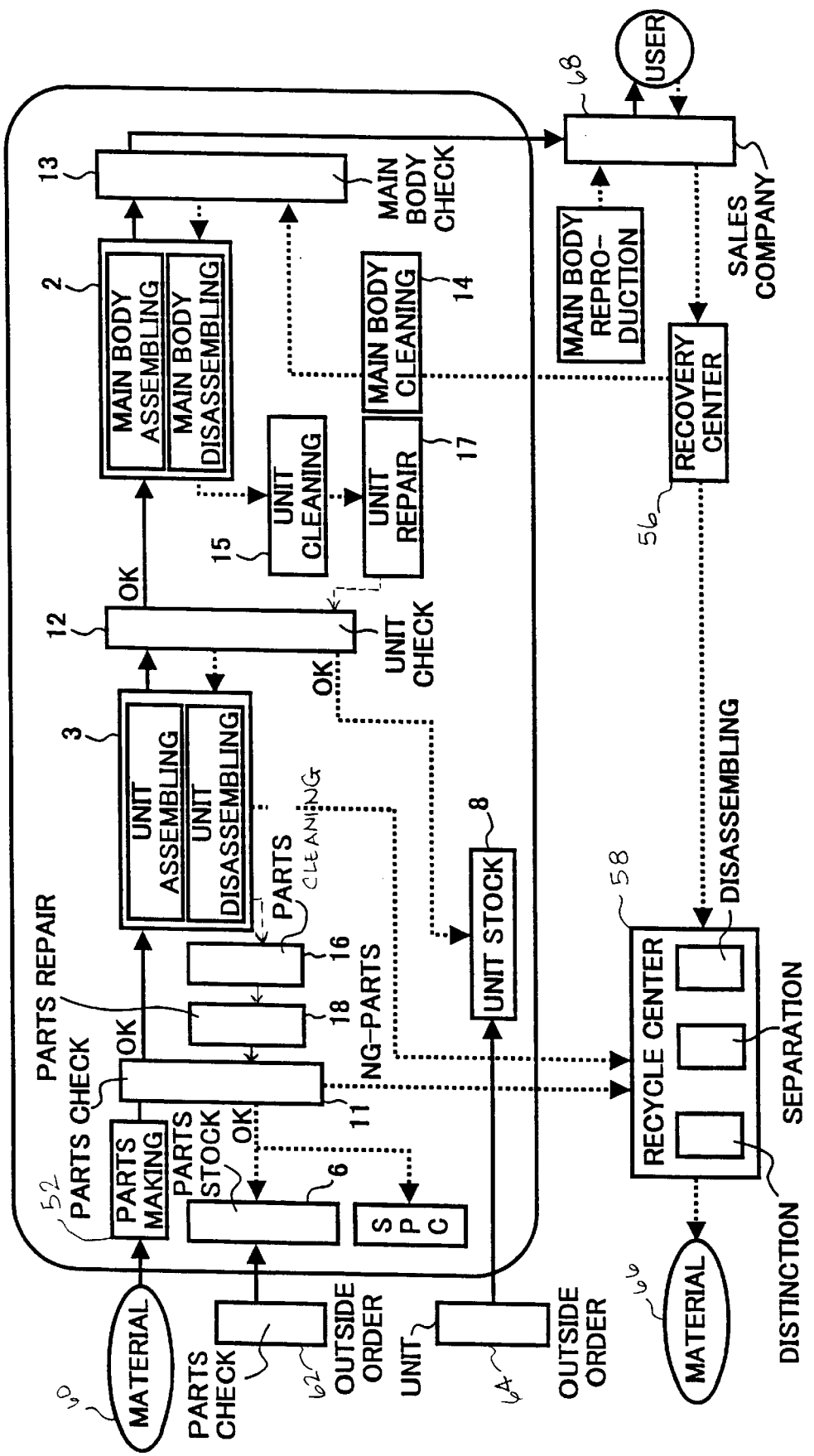
FIG. 2 is an overview of the product disassembling and assembling system of the present invention.

FIG. 2 is an overview of the product disassembling and assembling system of the present invention which performs the method illustrated in FIGS. 1A and 1B. The product disassembling and assembling system includes the parts making facility 52, parts check facilities 11 and 62, the parts storage warehouse 6, the parts repair facility 18, the parts cleaning facility 16, the unit assembling/disassembling facility 3, unit check facilities 12 and 64, the unit storage warehouse 6, the unit cleaning facility 15, the unit repair facility 17, the main body assembling/disassembling facility 2, the main body cleaning facility 14, the main body check facility 13, the recovery facility 56, and a recycle center 58.

The parts making facility 52 uses material 60 to manufacture the new parts of the product. The parts check facility 11 performs a quality check on the new parts and a quality check on the used parts in order to determine if the used parts can be reused in the product. The parts check facility 62 performs a check on parts from an outside order. The new parts and the used parts used in the unit assembling/disassembling facility 3 are stored in the parts storage warehouse 6. The parts cleaning facility 16 cleans and removes dirt attached to the used parts. The parts repair facility 18 repairs and restores the function of the used parts which may have deteriorated during use.

The unit assembling/disassembling facility 3 on working line 3 disassembles the used unit into used parts and assembles the new unit from new and used parts. The unit check facility 12 performs a quality check on the new units and a quality check on the used units in order to determine if the used units can be reused in the product. The unit check facility 64 performs a check on units from an outside order. The new units and the used units used in the main body assembling/disassembling facility 2 are stored in the unit storage warehouse 8. The unit cleaning facility 15 cleans and removes dirt attached to the used units. The unit repair facility 17 repairs and restores the function of the used units which may have deteriorated during use.

The main body assembling/disassembling facility 2 on working line 2 disassembles the main body of the used product into used units and assembles the main body of the new product from new and used units. The main body check facility 13 performs a final check on the main body of the new product and a final check on the main body of the used product in order to determine if the used product can be reused. The main body cleaning facility 14 cleans and removes dirt attached to and polluting the main body of the used product from use, transport, and storage.

Withdrawal from the market of the used product is performed by the sales company 68, the recovery facility 56, etc., and the used products, units, and/or parts determined to be non-reusable by check facilities 11, 12, and 13 are treated in the recycle center 58 and output as material 66.

Several of the facilities are multi-functional. The main body assembling and disassembling processes performed by the main body assembling/disassembling facility 2 on the working line 2 are the reverse of each other. Similarly, the unit assembling and disassembling processes performed by the unit assembling/disassembling facility 3 on the working line 3 are the reverse of each other. In addition, the main body checks of the new product and the used product are both performed by the main body check facility 13, the unit checks of the new units and the used units are both performed by the unit check facility 12, and the parts checks of the new parts and the used parts are both performed by the parts check facility 11. Also, the parts storage warehouse 6 stores both new and used parts and the unit storage warehouse 8 stores both new and used units.

Figure 3:
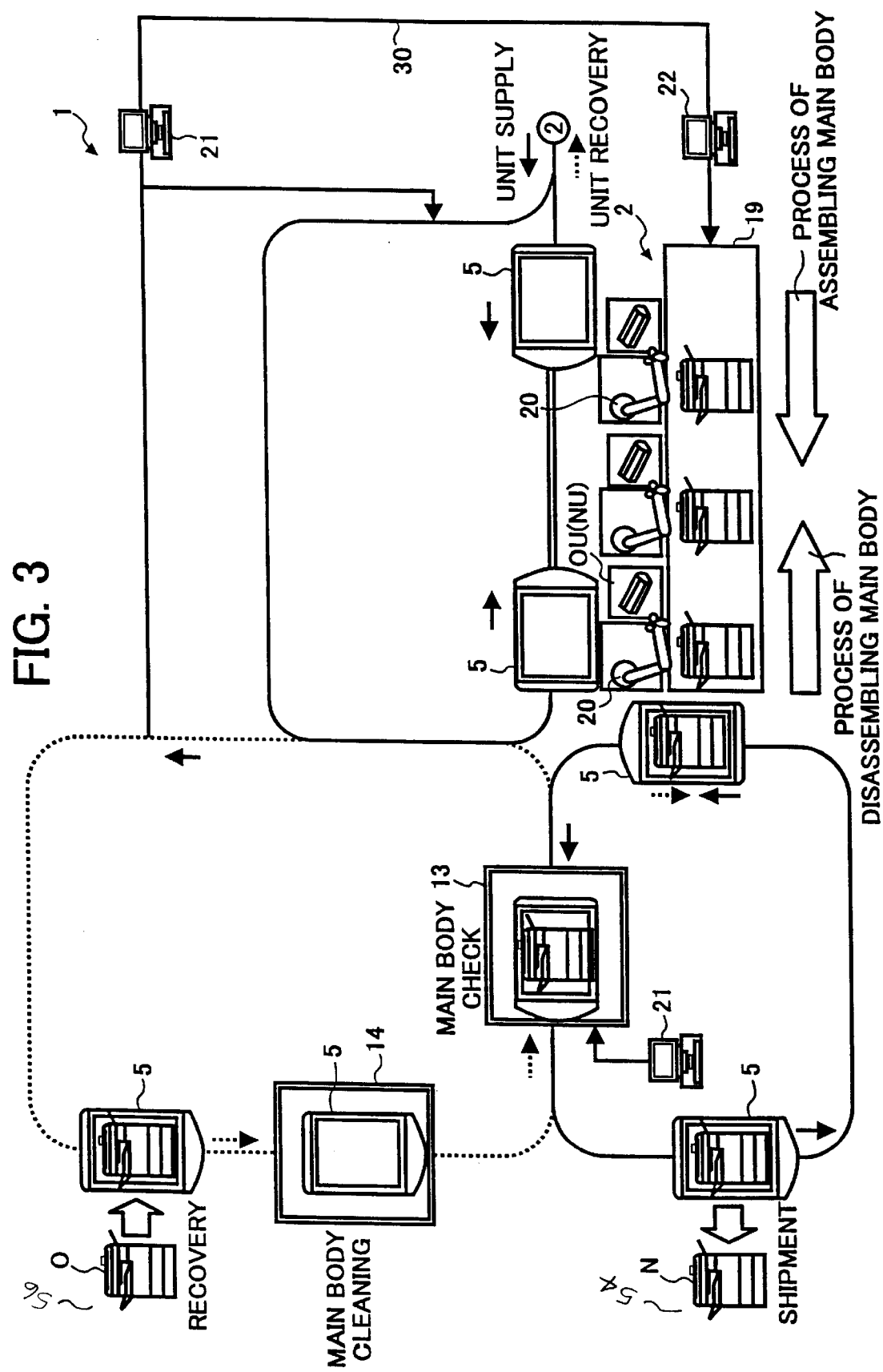
FIG. 3 is a concept diagram illustrating a first section of the system of the present invention.
Figure 4:
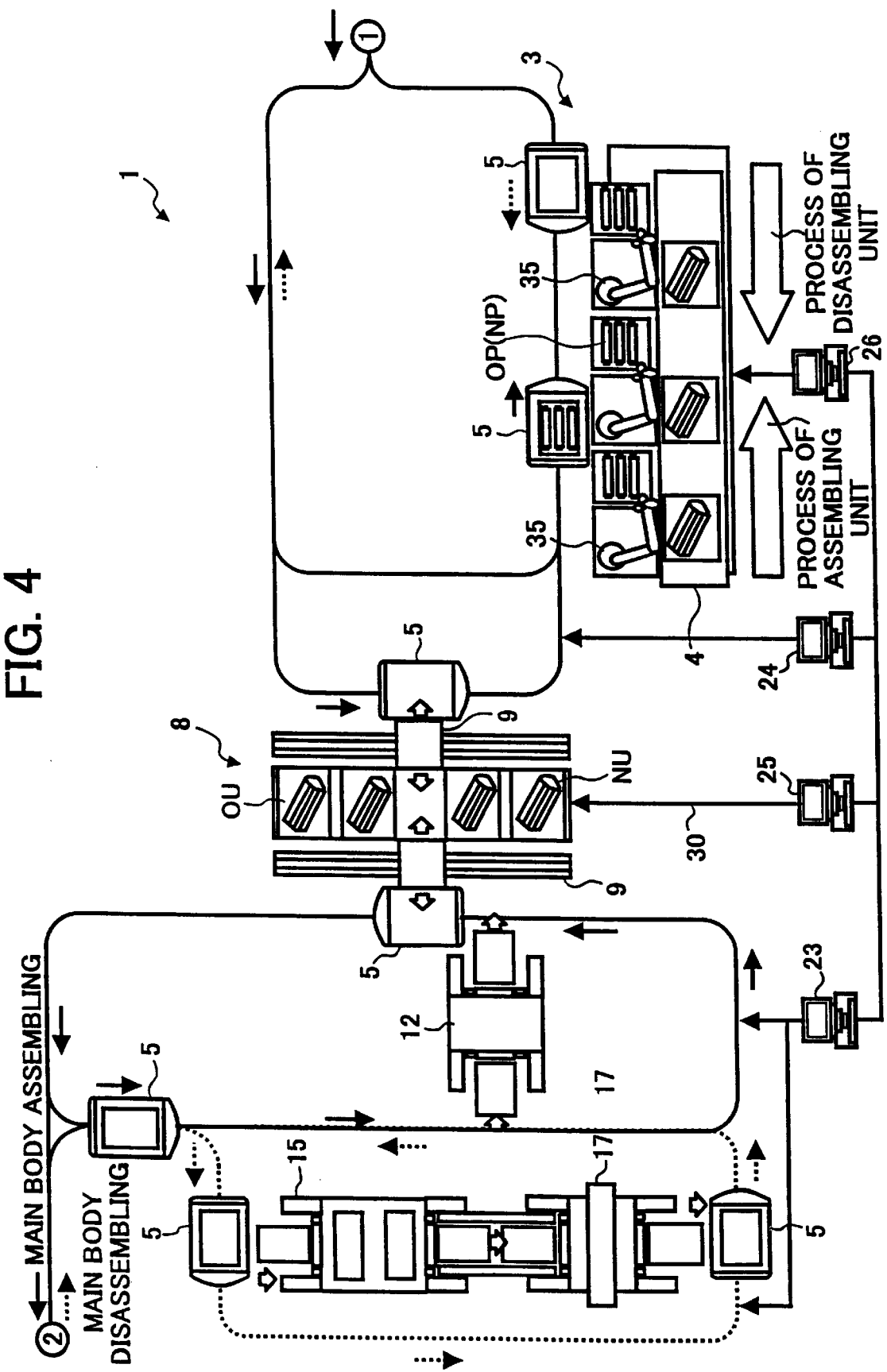
FIG. 4 is a concept diagram illustrating a second section of the system of the present invention.
Figure 5:
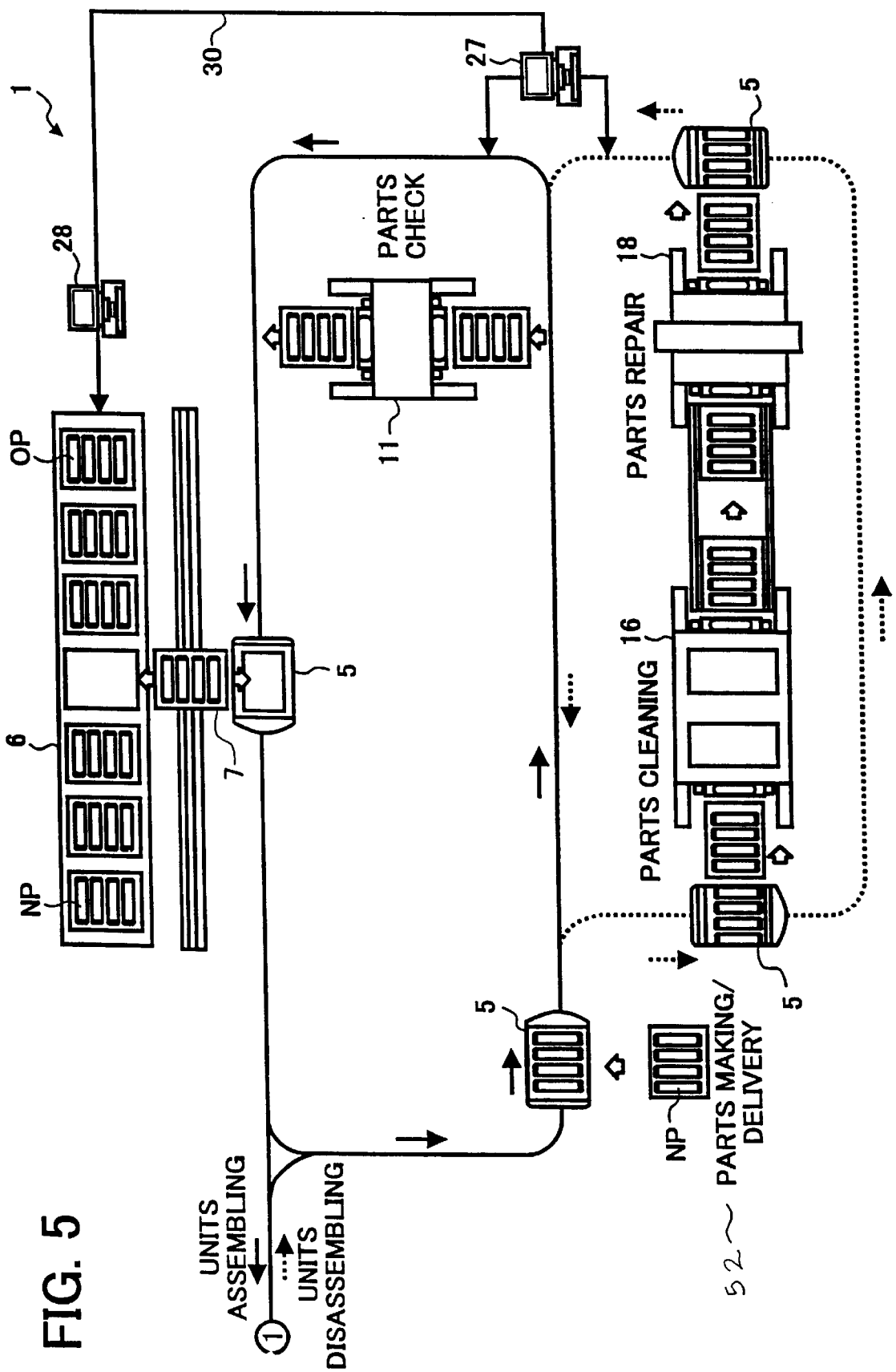
FIG. 5 is a concept diagram illustrating a third section of the system of the present invention.

FIGS. 3, 4, and 5 are concept diagrams illustrating a first, second, and third section, respectively, of the system of the present invention including the control system. In FIGS. 3 and 4, ② represents the connection between the respective lines in the figures. Similarly, in FIGS. 4 and 5, ① represents the connection between the respective lines in the figures. As shown in FIGS. 3, 4, and 5, an unmanned conveying vehicle (AGV) 5 performs the conveyance of the various parts, units, and products to the appropriate facilities in the system.

FIG. 3 shows the main body assembling/disassembling section of the system 1. The AGV 5 conveys either the used product main body O or the new product main body N to the appropriate facility, such as the recovery, main body cleaning, shipment, main body check, and main body assembling/disassembling facilities 56, 14, 54, 13, and 2, respectively. A conveying device 19, such as a conveyor, etc., conveys the main body through assembly and disassembly in the main body assembling/disassembling facility 2 on the working line 2.

On the working line 2, a row of robots 20 controlled by a main body process controlling computer 22 is arranged along the conveying device 19 for conveying the main body in the direction for assembly or disassembly. The main body conveying vehicle controlling computer 21 controls the AGV 5 and the main body process controlling computer 22 controls the working line 2.

FIG. 4 shows the unit assembling/disassembling section of the system 1. The AGV 5 conveys either the used units OU or the new units NU to the appropriate facility, such as the unit cleaning, repair, check, unit storage warehouse, and unit assembling/disassembling facilities 15, 17, 12, 8, and 3, respectively. A conveying device 4, such as a conveyor, etc. conveys the units through assembly and disassembly in the unit assembling/disassembling facility 3 on the working line 3. A stocker 9 delivers and receives the new units NU and the used units OU between the unit storage warehouse 8 and the AGV 5.

On the working line 3, a row of robots 35 controlled by the unit process control computer 26 is arranged along the conveying device 4 for conveying the units in the direction for assembly or disassembly. When preparing the used units in the unit cleaning, repair, and check facilities 15, 17, and 12, for example, a unit reproduction and conveyance controlling computer 23 controls the AGV 5 when conveying the units. When conveying units between the unit storage warehouse 8 and the unit assembling/disassembling facility 3 on the working line 3, a unit conveyance controlling computer 24 controls the AGV 5. A storage controlling computer 25 controls the storage of the used units OU and the new units NU. The unit process control computer 26 controls the working line 3.

FIG. 5 shows the parts section of the system 1. The AGV 5 conveys either the used parts OP or the new parts NP to the appropriate facility, such as the parts making, cleaning, repair, check, and parts storage warehouse facilities 52, 16, 18, 11, and 6, respectively. A stocker 7 delivers and receives the new parts NP and the used parts OP between the parts storage warehouse 6 and the AGV 5.

A parts storage controlling computer 27 controls the storage of the used parts OP and the new parts NP. A parts conveyance controlling computer 28 controls the AGV 5 for automatically conveying the newly made and delivered new parts NP or the cleaned, repaired, and checked used parts OP.

Figure 6:
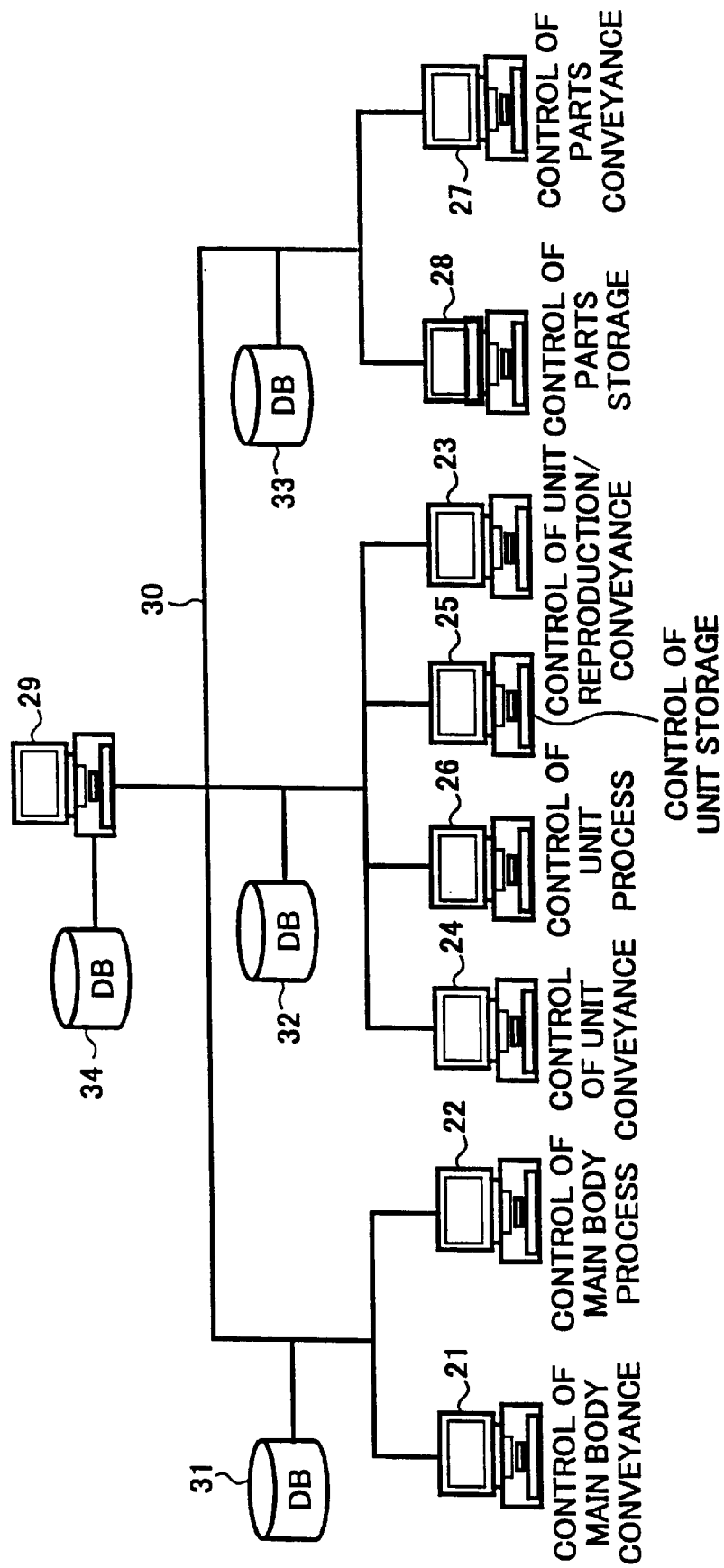
FIG. 6 is a block diagram of the control system of the product disassembling and assembling system of the present invention.

FIG. 6 is a block diagram of the control system of the product disassembling and assembling system of the present invention. A host computer 29 controls the control computers 21 through 28. The host computer 29 and the control computers 21 through 28 are connected to each other via a floor LAN 30.

The data used by the main body conveyance controlling computer 21 and the main body process controlling computer 22 to control the assembly and disassembly of the new and used product main bodies is stored in a database 31. The data used by the unit storage controlling computer 23, the unit conveyance controlling computer 24, the unit storage controlling computer 25, and the unit process controlling computer 26 to control the assembly and disassembly of the new and used units is stored in a database 32. The data used by the parts storage controlling computer 27 and the parts conveyance controlling computer 28 to control storage of the new and used parts and the conveyance thereof is stored in a database 33. The data used by the host computer 29 to control the entire disassembling and assembling system is stored in a database 34.

Figure 7:
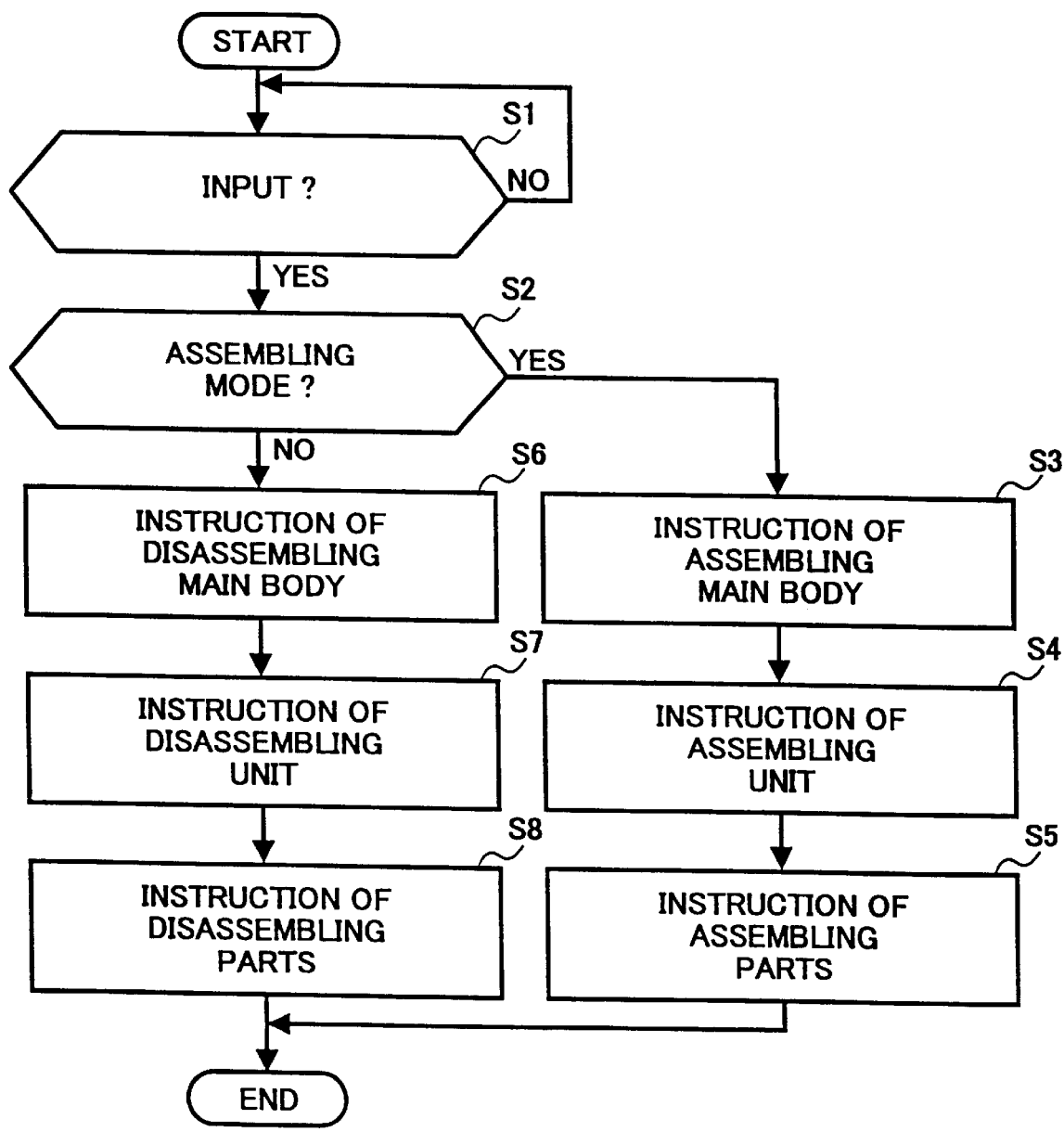
FIG. 7 is a flow chart illustrating the process performed by the control system to control the system of the present invention.

FIG. 7 is a flow chart illustrating the process performed by the control system to control the system of the present invention. In the system 1, assembly and disassembly can be selectively practiced. The selection of either assembly (the assembly mode) or disassembly (the disassembly mode) is determined by the host computer in a predetermined operation.

As shown in FIG. 7, when the selection of the assembly mode or the disassembly mode is inputted (Step S1, Y) to the host computer 29, the host computer 29 judges the input to determine whether the selected mode is for assembly or disassembly (Step S2). In addition, when the selection of the mode is inputted, the models of the product to be assembled or disassembled, the number of the manufactured products, etc., are set.

If the assembly mode is selected (Step S2, Y), the product disassembling and assembling system 1 is configured to assembly mode by the host computer 29. Namely, in accordance with a production plan stored in the database 34, instructions for assembling the product are sent to the main body conveyance controlling computer 21 and the main body process controlling computer 22 (Step S3). Furthermore, in accordance with the production plan, instructions for assembling the units are sent to the unit reproduction and conveyance controlling computer 23, the unit conveyance controlling computer 24, the unit storage controlling computer 25, and the unit process controlling computer 26 (Step S4). Furthermore, in accordance with the production plan, instructions for preparing the parts are sent to the parts conveyance controlling computer 27 and the parts storage controlling computer 28 (Step S5).

If the disassembly mode is selected (Step S2, N), the product disassembling and assembling system 1 is configured to disassembly mode by the host computer 29. Namely, in accordance with a reproduction plan stored in the database 34, instructions for disassembling the used product are sent to the main body conveyance controlling computer 21, and the main body process controlling computer 22 (Step S6). Furthermore, in accordance with the reproduction plan, instructions for disassembling the units are sent to the unit reproduction and conveyance controlling computer 23, the unit conveyance controlling computer 24, the unit storage controlling computer 25, and the unit process controlling computer 26 (Step S7). Furthermore, in accordance with the reproduction plan, instructions for purchasing and storing the parts are sent to the parts conveyance controlling computer 27 and the parts storage controlling computer 28 (Step S8).

The host computer performs the operation of FIG. 7 and thereafter, the operations of the control computers 21 through 28 are performed. First, the operations performed by the main body conveyance controlling computer 21 and the main body process controlling computer 22 in the assembly mode are described hereafter.

The information regarding the various models of the product that can be manufactured in the system 1 (model information), the information regarding the used and new units used for assembling the respective models (model unit information), the information regarding the concrete procedure of assembling the new product main body using the respective new and used units (main body assembling procedure), the information regarding the storage of the respective new and used units in the unit storage warehouse 8 (unit storage information), the information regarding the conveyance path of the AGV 5 for conveying the new and used units from the unit storage warehouse 8 to the working line 2 (unit conveyance path information), the information regarding the conveyance path of the AGV 5 for conveying the new product main body assembled on the working line 2 (main body conveyance path information), and the information regarding the desired quality for checking the assembled main body in the main body check facility 13 (main body check quality information) are stored in the database 31.

Figure 8:
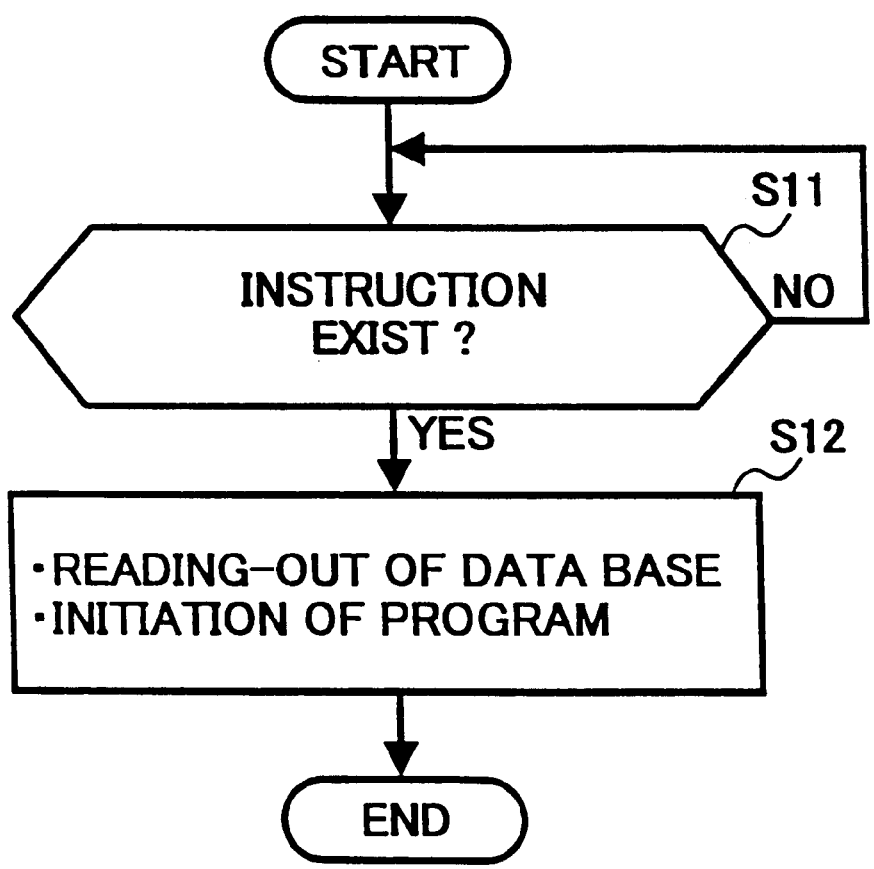
FIG. 8 is a flow chart illustrating the process performed by the computers controlled by the host computer of the present invention.

As shown in FIG. 8, when the main body process controlling computer 22 receives detailed setting information such as the instructions (commands) for practicing the assembly mode and the model of the product main body to be manufactured from the host computer 29 (Step S11), the main body process controlling computer 22 reads information from the database 31, such as the model information, the model unit information, the main body assembling procedure, the main body check quality information, etc. And the main body process controlling computer 22 initiates the program for controlling the not-shown checking apparatus prepared in the robots 20, the conveying device 19, and the main body check facility 13 (Step S12).

Furthermore, as shown in FIG. 8, when the main body conveyance controlling computer 21 receives detailed setting information such as the instructions (commands) for practicing the assembly mode and the model of the product main body to be manufactured from the host computer 29 (Step S11), the main body conveyance controlling computer 21 reads information from the database 31, such as the unit conveying path information and the main body check quality information. And the main body conveyance controlling computer 21 initiates the program for controlling the AGV 5 (Step S12).

According to the above-mentioned operations, it is possible to assembly a predetermined model of a new product main body.

Next, the operations performed by the main body conveyance controlling computer 21 and the main body process control computer 22 in the disassembly mode are described.

The information regarding the various product models which can be disassembled in the present system 1 (model information), the information regarding the respective used units after being disassembled per model of the product (model unit information), the information regarding the concrete procedure for disassembling the used product main body into the respective used units (main body disassembling procedure), the information regarding the respective new and used units stored in the unit storing warehouse 8 (unit storage information), the information regarding the conveying path of the AGV 5 for conveying the disassembled used unit to the unit storage warehouse 8, etc. (unit conveying path information), the information regarding the conveying path of the AGV 5 for conveying the used product main body to be disassembled from the main body check facility 13 to the working line 2 (main body conveying path information), and the information regarding the desired quality for checking the used product main body in the main body check facility 13 (main body check quality information) are stored in the database 31.

As shown in FIG. 8, when the main body process controlling computer 22 receives detailed setting information such as the instructions (commands) for practicing the disassembly mode and the model of the product main body to be disassembled from the host computer 29 (Step S11), the main body process controlling computer 22 reads information from the database 31, such as the model information, the model unit information, the main body disassembling procedure, the main body check quality information, etc. And the main body process controlling computer 22 initiates the program for controlling the not-shown checking apparatus prepared in the robots 20, the conveying device 19, and the main body check facility 13 (Step S12).

Furthermore, as shown in FIG. 8, when the main body conveyance controlling computer 21 receives detailed setting information such as the instructions (commands) for practicing the disassembly mode and the model of the product main body to be disassembled from the host computer 29 (Step S11), the main body conveyance controlling computer 21 reads information from the database 31, such as the unit conveying path information and the main body check quality information. And the main body conveyance controlling computer 21 initiates the program for controlling the AGV 5 (Step S12).

According to the above-mentioned operations, it is possible to disassemble a predetermined model of the used product main body.

The operations performed by the unit reproduction and conveyance controlling computer 23, the unit conveyance controlling computer 24, the unit storage controlling computer 25, and the unit process controlling computer 26 in the assembly mode are described hereafter.

The information regarding the new and used units of the various models of the product manufactured in the present system 1 (model information), the information regarding the respective new and used parts used for assembling the new units of the respective models (model unit information), the information regarding the concrete procedure for assembling the respective new units using the new and used parts (unit assembling procedure), the information regarding the storage of the new and used parts in the parts storage warehouse 6 (parts storage information), the information regarding the conveyance path of the AGV 5 for conveying the new and used parts stored in the parts storage warehouse 6 to the working line 3 and for conveying the new unit after assembling to the unit check facility 12 (unit conveying path information), and the information regarding the desired quality of the new unit after assembling checked in the unit check facility 12 (unit checking quality information), are respectively stored in the database 32.

As shown in FIG. 8, when the unit process controlling computer 26 receives detailed setting information such as the instructions (commands) for practicing the assembly mode and the model of the product main body to be manufactured from the host computer 29 (Step S11), the unit process controlling computer 26 reads information from the database 32, such as the model information, the model unit information, the unit assembling procedure information, the unit checking quality information, etc. And the unit process controlling computer 26 initiates the program for controlling the checking device (not shown) prepared in the robots 35, the conveying device 4, and the unit check facility 12 (Step S12).

Furthermore, as shown in FIG. 8, when the the unit conveyance controlling computer 24 receives detailed setting information such as the instructions (commands) for practicing the assembly mode and the model of the product main body to be manufactured from the host computer 29 (Step S11), the unit conveyance controlling computer 24 reads information from the database 32, such as the unit conveying path information. And the unit conveyance controlling computer 24 initiates the program for controlling the AGV 5 employed when assembling the new unit (Step S12).

As shown in FIG. 8, when the unit reproduction conveyance controlling computer 23 receives detailed setting information such as the instructions (commands) for practicing the assembly mode and the model of the product main body to be manufactured from the host computer 29 (Step S11), the unit reproduction conveyance controlling computer 23 reads information from the database 32, such as the unit conveying path information. At this time, the unit reproduction conveyance controlling computer 23 initiates the program for controlling the AGV 5 (Step S12).

As shown in FIG. 8, when the unit storage controlling computer 25 receives detailed setting information such as the instructions (commands) for practicing the assembly mode and the model of the product main body to be manufactured from the host computer 29 (Step S11), the unit storage controlling computer 25 reads the parts storage information from the database 32 and initiates the control program for controlling the unit storage warehouse 8 (Step S12).

According to the above-mentioned operations, it is possible to assembly a new unit for a predetermined model of a new product on the working line 3.

The operations performed by the unit reproduction and conveyance controlling computer 23, the unit conveyance controlling computer 24, the unit storage controlling computer 25, and the unit process controlling computer 26 in the disassembly mode are described hereafter.

The information regarding the used units of the various models of the product manufactured in the present system 1 (model information), the information regarding the respective used parts after disassembling the used units of the respective models (model unit information), the information regarding the concrete procedure of disassembling the used units into the respective used parts (unit disassembling procedure), the information regarding the storage of the new and used parts in the parts storage warehouse 6 (parts storage information), the information regarding the conveying path of the AGV 5 for conveying the disassembled used unit to the unit check facility 12 or the unit storage warehouse 8 (unit conveying path information), and the information regarding the desired quality of the disassembled used unit for checking in the unit check facility 12 (unit checking quality information) are respectively stored in the database 32.

As shown in FIG. 8, when the unit process controlling computer 26 receives detailed setting information such as the instructions (commands) for practicing the disassembly mode and the model of the product main body to be manufactured from the host computer 29 (Step S11), the unit process controlling computer 26 reads information from the database 32, such as the model information, the model unit information, the unit disassembling procedure information, the unit checking quality information, etc. And the unit process controlling computer 26 initiates the program for controlling the checking device (not shown) prepared in the robots 35, the conveying device 4, and the unit check facility 12 used in disassembling the used unit (Step S12).

Furthermore, as shown in FIG. 8, when the the unit conveyance controlling computer 24 receives detailed setting information such as the instructions (commands) for practicing the disassembly mode and the model of the product main body to be manufactured from the host computer 29 (Step S11), the unit conveyance controlling computer 24 reads information from the database 32, such as the unit conveying path information. And the unit conveyance controlling computer 24 initiates the program for controlling the AGV 5 employed when disassembling the used unit (Step S12).

As shown in FIG. 8, when the unit reproduction conveyance controlling computer 23 receives detailed setting information such as the instructions (commands) for practicing the disassembly mode and the model of the product main body to be manufactured from the host computer 29 (Step S11), the unit reproduction conveyance controlling computer 23 reads information from the database 32, such as the unit conveying path information. And the unit reproduction conveyance controlling computer 23 initiates the program for controlling the AGV 5 used in disassembling the used unit (Step S12).

As shown in FIG. 8, when the unit storage controlling computer 25 receives detailed setting information such as the instructions (commands) for practicing the disassembly mode and the model of the product main body to be manufactured from the host computer 29 (Step S11), the unit storage controlling computer 25 reads the parts storage information from the database 32 and initiates the control program for controlling the unit storage warehouse 8 (Step S12).

In accordance with the above-mentioned operations, the used units of a predetermined model of the product may be disassembled.

The operations performed by the parts storage controlling computer 28 and the parts conveyance controlling computer 27 in an assembly mode are described hereafter.

The information regarding the new and used parts constructing the respective new and used units of the respective models of the product main body (model parts information), the information regarding the control of the storage of the new and used parts in the parts storage warehouse 6 (parts storage information), and the information regarding the conveying path of the AGV 5 for conveying the new and used parts between the parts storing warehouse 6 and the working line 3 (parts conveying path information) are stored in the database 33.

As shown in FIG. 8, when the parts storage controlling computer 28 receives detailed setting information such as the instructions (commands) for practicing the assembly mode and the model of the product main body to be manufactured from the host computer 29 (Step S11), the parts storage controlling computer 28 reads model parts information and the parts storage information from the database 33 and initiates the control program for controlling the parts storage warehouse 6 (Step S12).

Furthermore, as shown in FIG. 8, when the parts conveyance controlling computer 27 receives detailed setting information such as the instructions (commands) for practicing the assembly mode and the model of the product main body to be manufactured from the host computer 29 (Step S11), the parts conveyance controlling computer 27 reads the parts conveying path information, etc., from the database 33 and initiates the program for controlling the AGV 5 employed for conveying the new and used parts (Step S12).

According to the above-mentioned operations, the new and used parts for a predetermined model of the product can be conveyed.

The operations of the parts storage controlling computer 28 and the parts conveyance controlling computer 27 in the disassembly mode are described hereafter.

The information regarding the new and used parts constructing the respective new and used units of the respective models of the product main body N (model parts information), the information regarding the control of the storage of the new and used parts in the parts storage warehouse 6 (parts storage information), and the information of the conveying path for the AGV 5 conveying the new parts and the used parts after being disassembled in the working line 3 into the parts storage warehouse 6 (parts conveying path information) are stored in the database 33.

As shown in FIG. 8, when the parts storage controlling computer 28 receives detailed setting information such as the instructions (commands) for practicing the disassembly mode and the model of the product main body to be manufactured from the host computer 29 (Step S11), the parts storage controlling computer 28 reads the model parts information and the parts storage information, for example, from the database 33 and initiates the control program for controlling the parts storage warehouse 6 (Step S12).

Furthermore, as shown in FIG. 8, when the parts conveyance controlling computer 27 receives detailed setting information such as the instructions (commands) for practicing the disassembly mode and the model of the product main body to be manufactured from the host computer 29 (Step S11), the parts conveyance controlling computer 27 reads information such as the parts conveying path information from the database 33 and initiates the program for controlling the AGV 5 employed for conveying the used parts after being disassembled on the working line 3 to the parts storage warehouse 6 (Step S12).

According to the above-mentioned operations, the used parts of a predetermined model of the product can be conveyed.

By performing the operations of FIG. 7 and FIG. 8, the present system 1 can perform the process as described hereafter.

First, on the working line 2, in accordance with the production plan and the reproduction plan both stored in the database 34, the new and used units are automatically assembled in order on the product main body through cooperation of the robots 20 and the conveying device 19 in the assembly mode, and similarly, the used units are automatically disassembled in order on the used product main body through cooperation of the robot 20 and the conveying device 19 in the disassembly mode. Fastening members such as screws, snap fits, etc. are used to assemble the units on the product main body. In the disassembly mode, the fastening members such as the screws, snap fits, etc., on the used product main body are released in the reverse order to that of the assembly mode. The used unit is taken out of the used product main body and put on the AGV 5 for conveying.

The conveying device 19 conveys the product main body in the positive (normal) direction of assembling in order to place the new and used parts onto the main body, in the assembly mode. In the disassembly mode, the conveying device 19 conveys the used product main body in the reverse direction to that of the assembly mode. Generally, the conveying device 19 is the conveyor. However, the AGV 5 can be used instead of the conveyor.

When the product main body is assembled on the working line 2 which is the main body assembling/disassembling facility 2, the desired number of new and used units stored in the unit storage warehouse 8 are moved onto the working line 2, as needed. When the used product main body is disassembled on the working line 2, the used unit is automatically disassembled, taken out of the used product main body, and conveyed to the unit cleaning facility 15, the repair facility 17, the check facility 12, the working line 3, and the unit storage warehouse 8.

On the working line 3 which is the unit assembling/disassembling facility 3, the new and used parts are automatically assembled in order into the unit, in the assembly mode, through the cooperation of the robots 35 and the conveying device 4. Fastening members such as screws, snap fits, etc., are used to assemble the parts into the unit. In the disassembly mode, the fastening members such as the screws, snap fits, etc. are released in the reverse order to that of the assembly mode. The used parts are taken out in order from the used unit and put on the AGV 5 for conveying.

In the assembly mode, the conveying device 4 conveys in order the new and used parts in the positive (normal) direction of assembling them into the units. In the disassembling mode, the conveying device 4 conveys the used unit in the reverse direction to that of the assembly mode. Generally, the conveyor is used as the conveying device 4. However, the AGV 5 can be used instead of the conveyor.

In the assembly mode, the AGV 5 conveys the desired number of new and used parts previously stored in the parts storage warehouse 6 onto the working line 3, as needed. In the disassembly mode, the used parts taken out of the used unit on the working line 3 are conveyed to the parts cleaning facility 16, the repair facility 18, the check facility 11, and the parts storage warehouse 6 for subsequent processing.

In order to guarantee the same quality of the reproduced product, i.e., the product with reused parts and units, as a brand new product, the reproduced product is checked in the main body check facility 13. The units and parts after being checked in the unit check facility 12 and the parts check facility 11, respectively, are thrown into the production line and used in the reproduced product. Almost all of the check items, devices, and facilities, etc., used in parts, unit, and main body checks may be commonly used for both assembly and disassembly.

The usage career differs each used product. So, in the main body check facility 13 when checking the used product for disassembly, the name, model, manufacturing number, installment time, installment environment, usage frequency (number of copied sheets), trouble career, parts exchanged, and actual usage results (records) accumulated during the time period used are checked. A judgement is then made on whether the used product should be reused.

For the new product, the main body checking facility 13 performs an image check, an electric check, etc. after assembly.

The unit check facility 12 commonly utilizes check items, devices, and facilities when checking the unit property and function of the new units to be supplied for assembly, and when checking the unit property and function of the used units to determine whether the used units from the used product can be reused after cleaning, repair, etc.

The parts check facility 11 commonly utilizes check items, devices, and facilities when performing a mechanical check of the outer appearance, shape, and size, etc., an electrical characteristics check, and an optical characteristics check on the new parts that are newly processed and manufactured in order to supply them for the new units, and when performing the same checks on the used parts from the used product to determine whether the used parts can be reused after cleaning, repair, etc.

After the new parts are checked in the parts check facility 11, they are conveyed into the parts storage warehouse 6 and stored there temporarily. After the used parts are checked in the parts check facility 11, they are also conveyed to the parts storage warehouse 6 and stored there temporarily. Since the used parts are checked in the same manner as the new parts, their quality is assured. Therefore, in the parts storage warehouse 6, the new and used parts do not need to be distinguished from each other. A common storage warehouse can be used. Exemplary warehouses include shelves, racks, flatcars, automatic warehouses, etc.

After the new units are assembled on the working line 3 and the quality checked in the unit check facility 12, the new units are conveyed to the unit storage warehouse 8 and temporarily stored there. After the used units are taken from the disassembled used products, cleaned, repaired, and the quality checked in the unit check facility 12, the used units are conveyed to the unit storage warehouse 8 and temporarily stored there. Since the used units are checked in the same manner as the new units, their quality is assured. Therefore, in the unit storage warehouse 8, the new and used units do not need to be distinguished from each other. A common storage warehouse can be used. Exemplary warehouses include shelves, racks, flatcars, automatic warehouses, etc.

According to the aforementioned system 1 for disassembling and assembling the product, including producing the new product main body and disassembling the used product main body and offering the used units and parts from the used product for producing the new product, the working lines 2 and 3, the check facilities 11, 12, and 13, and the storage warehouses 6 and 8 are jointly used for both assembly and disassembly. The working lines 2 and 3 can perform both the assembling steps and, reversibly, the disassembling steps. And the check facilities 11, 12, and 13 and the storage warehouses 6 and 8 can perform the same steps during both assembly and disassembly. Consequently, separate facilities for assembly and disassembly are not needed, making it possible to provide a compact structure of the entire system and reduce the product manufacturing cost.

Furthermore, since the host computer 29 controls the program and data used to control these facilities, the product manufacturing cost can be reduced.

In the first aspect of the invention, the facilities are jointly used to perform reversible operations and/or the same operation for both assembly and disassembly. Therefore, the same facilities can be used for both assembly and disassembly, the entire structure of the system can be made compact, and the product manufacturing cost can be reduced.

The second aspect of the invention can change over a program and the data employed in the program on a control computer between assembly and disassembly modes, such that the facility that is controlled by the control computer can be used for both modes. Consequently, the product manufacturing cost can be reduced.

Since the third aspect can use a plurality of facilities controlled by the computer in a gross, the product manufacturing cost can be further reduced.

Since the fourth aspect performs reversibly the assembly and disassembly of the unit and parts using the same facility, the product manufacturing cost can be reduced.

Since the fifth aspect performs reversibly the assembly and disassembly of the product main body or the unit using the same facility, the product manufacturing cost can be further reduced.

In the sixth aspect, the newly-made unit and the used unit after being disassembled are temporarily stored in the same storage warehouse. Thus, the product manufacturing cost can be further reduced.

In the seventh aspect, the newly-made parts and the used parts after being disassembled are temporarily stored in the same storage warehouse. Thus, the product manufacturing cost can be further reduced.

Since the eighth and ninth aspects, respectively, perform the same conveying operation with the same conveying device, the product manufacturing cost can be reduced.

Since the tenth, eleventh, and twelfth aspects, respectively, perform the same checking operation with the same check facility, the product manufacturing cost can be reduced.

In the thirteenth aspect, the facilities are jointly used to perform reversible operations and/or the same operation for both assembly and disassembly. Therefore, the same facilities can be used for both assembly and disassembly, the entire structure of the system can be made compact, and the product manufacturing cost can be reduced.

Since the fourteenth aspect can use the facility controlled by a computer for assembly and disassembly simply by changing over the program and the data employed in the program on the computer, the product manufacturing cost can be reduced.

Since the fifteenth aspect can use the facility controlled by the computer in a gross, the product manufacturing cost can also be reduced.

Since the sixteenth and the seventeenth aspects reversibly perform assembling the unit or the parts and disassembling the used product into the unit or the parts using the same facility, the product manufacturing cost can be reduced.

In the eighteenth and nineteenth aspects, respectively, the newly-made unit or parts and the used unit or parts after being disassembled are temporarily stored in the same storage warehouse. Consequently, the product manufacturing cost can be reduced.

Since the twentieth and twenty-first aspects, respectively, perform the same assembling operation using the same conveying device, the product manufacturing cost can be reduced.

Since the twenty-second, twenty-third, and twenty-fourth aspects, respectively, perform the same checking operation with the same check facility, the product manufacturing cost can be reduced.

The preferred embodiment of the present invention and the advantageous functional effects thereof over the background arts have been described heretofore. In describing the preferred embodiment of the present invention illustrated in the accompanying drawings, specific terminology is employed for the sake of clarity. However, the present invention is not intended to be limited to the specific terminology so selected and it is to be understood that each specific element includes all technical equivalents which operate in a similar manner.

Accordingly, numerous additional modifications and variations of the present invention are possible in light of the above teachings. It is therefore to be understood that, within the scope of the appended claims, the present invention may be practiced otherwise than as specifically described herein.

What is claimed as new and desired to be secured by Letters Patent of the United States is:

1. A product disassembling and assembling system, comprising:
    a production facility for performing a first process of assembling a product;
    a processing facility for performing a second process of disassembling a used product into a unit and parts, and offering the unit and parts thus disassembled for assembly in a product; and
    a commonly-used processing facility for performing at least one of (1) at least one mutually reversible step between the first process and the second process, and (2) at least one step that is identical for both the first and second processes,
    wherein said commonly-used processing facility is computer controlled.

2. The product disassembling and assembling system as defined in claim 1, further comprising:
    a changing-over device for changing over a program employed in a computer and data employed in said program corresponding to said first process or said second process in order to perform said first process or said second process, respectively,
    wherein said computer controls said commonly-used processing facility.

3. The product disassembling and assembling system as defined in claim 2, wherein said computer controls a plurality of commonly-used processing facilities, and
    wherein said changing-over device performs a collective changing-over operation on said plurality of commonly-used processing facilities.

4. The product disassembling and assembling system as defined in claim 1, wherein said commonly-used processing facility comprises a main body assembling and disassembling facility used in a process for assembling at least one of a newly-made unit and the unit disassembled to construct the product, and in another process, for disassembling said used product into the unit disassembled.

5. The product disassembling and assembling system as defined in claim 4, comprising:
    a second commonly-used processing facility including a unit storage warehouse used in a process of temporarily preserving the newly-made unit for constructing the product and, in another process, for temporarily preserving the unit disassembled from the used product; and
    a third commonly-used processing facility including a conveying device used in a process for conveying the unit disassembled from the used product from said main body assembling and disassembling facility to said unit storage warehouse and, in another process, for conveying at least one of the unit disassembled from the used product and the newly-made unit from said unit storage warehouse to said main body assembling and disassembling facility.

6. The product disassembling and assembling system as defined in claim 1, wherein said commonly-used processing facility comprises a unit assembling and disassembling facility used in a process for assembling at least one of newly-made parts and the parts disassembled into a unit constructing the product, and in another process, for disassembling the unit disassembled from the used product or the used product into the parts disassembled.

7. The product disassembling and assembling system as defined in claim 6, comprising:
    a second commonly-used processing facility including a parts storage warehouse used in a process for temporarily preserving the newly-made parts and, in another process, for temporarily preserving the parts disassembled from the used product; and
    a third commonly-used processing facility including a conveying device used in a process for conveying the parts disassembled from the used product from said unit assembling and disassembling facility to said parts storage warehouse and, in another process, for conveying at least one of the parts disassembled from the used product and the newly-made parts from said parts storage warehouse to said unit assembling and disassembling facility.

8. The product disassembling and assembling system as defined in claim 1, wherein said commonly-used processing facility comprises a unit storage warehouse used in a process for temporarily preserving a newly-made unit and, in another process, for temporarily preserving the unit disassembled from the used product.

9. The product disassembling and assembling system as defined in claim 1,
    wherein said commonly-used processing facility comprises a parts storage warehouse used in a process for temporarily preserving newly-made parts and, in another process, for temporarily preserving the parts disassembled from the used product.

10. The product disassembling and assembling system as defined in claim 1, wherein said commonly-used processing facility comprises a main body checking facility used in a process for checking the product after assembling the product and, in another process, for checking the used product before disassembling the used product.

11. The product disassembling and assembling system as defined in claim 1, wherein said commonly-used processing facility comprises a unit checking facility used in a process for checking a newly-made unit and, in another process, for checking the unit disassembled from the used product.

12. The product disassembling and assembling system as defined in claim 1, wherein said commonly-used processing facility comprises a parts checking facility used in a process for checking newly-made parts and, in another process, for checking the parts disassembled from the used product.

13. A method of disassembling and assembling a product, comprising:
    performing a first process of assembling a product using a production facility;
    performing a second process of disassembling a used product into a unit and parts, and offering the unit and parts thus disassembled for assembly in a new product using a processing facility; and
    performing at least one of (1) at least one mutually reversible steps step between the first process and the second process, and (2) at least one step that is identical for both the first and second processes, using a computer-controlled commonly-used processing facility.

14. The method of disassembling and assembling a product as defined in claim 13, further comprising:

changing over a program employed in a computer and data employed in said program corresponding to said first process or said second process in order to perform said first process or said second process, respectively; and using said computer to control said commonly-used processing facility.

15. The method of disassembling and assembling a product as defined in claim 14, comprising:

using said computer to control a plurality of commonly-used processing facilities; and performing said changing over step collectively on said plurality of commonly-used processing facilities.

16. The method of disassembling and assembling a product as defined in claim 13, comprising:

using a main body assembling and disassembling facility as said commonly-used processing facility in a process for assembling at least one of a newly-made unit and the unit disassembled to construct the product and, in another process, for disassembling said used product into the unit disassembled.

17. The method of disassembling and assembling a product as defined in claim 16, comprising:

using a unit storage warehouse as a second commonly-used processing facility in a process of temporarily preserving the newly-made unit and, in another process, for temporarily preserving the unit disassembled from the used product; and using a conveying device as a third commonly-used processing facility in a process for conveying the unit disassembled from the used product from said main body assembling and disassembling facility to said unit storage warehouse and, in another process, for conveying at least one of the unit disassembled from the used product and the newly-made unit from said unit storage warehouse to said main body assembling and disassembling facility.

18. The method of disassembling and assembling a product as defined in claim 13, comprising:

using a unit assembling and disassembling facility as the commonly-used processing facility in a process for assembling at least one of newly-made parts and the parts disassembled into a unit constructing the product and, in another process, for disassembling the unit disassembled from the used product or the used product into the parts disassembled.

19. The method of disassembling and assembling a product as defined in claim 18, comprising:

using a parts storage warehouse as a second commonly-used processing facility in a process for temporarily preserving the newly-made parts and, in another process, for temporarily preserving the parts disassembled from the used product; and using a conveying device as a third commonly-used processing facility in a process for conveying the parts disassembled from the used product from said unit assembling and disassembling facility to said parts storage warehouse, and in another process, for conveying at least one of the parts disassembled from the used product and the newly-made parts from said parts storage warehouse to said unit assembling and disassembling facility.

20. The method of disassembling and assembling a product as defined in claim 13, comprising:

using a unit storage warehouse as the commonly-used processing facility in a process for temporarily preserving a newly-made unit and, in another process for temporarily preserving the unit disassembled from the used product.

21. The method of disassembling and assembling a system as defined in claims 13, comprising:

using a parts storage warehouse as the commonly-used processing facility in a process for temporarily preserving newly-made parts and, in another process, for temporarily preserving the parts disassembled from the used product.

22. The method of disassembling and assembling a product as defined in claim 13, comprising:

using a main body checking facility as the commonly-used processing facility in a process for checking the product after assembling the product and, in another process, for checking the used product before disassembling the used product.

23. The method of disassembling and assembling a product as defined in claim 13, comprising:

using a unit checking facility as the commonly-used processing facility in a process for checking a newly-made unit and, in another process, for checking the unit disassembled from the used product.

24. The method of disassembling and assembling system as defined in claim 13, comprising:

using a parts checking facility as the commonly-used processing facility in a process for checking newly-made parts and, in another process, for checking the parts disassembled from the used product.

* * * * *